United States Patent [19]

Gill

[11] 4,117,607
[45] Oct. 3, 1978

[54] MATHEMATICS TEACHING SYSTEM

[76] Inventor: Gary Gill, 1440 E. Sycamore Ave., El Segundo, Calif. 90245

[21] Appl. No.: 786,291

[22] Filed: Apr. 11, 1977

[51] Int. Cl.² .......................................... G09B 19/02
[52] U.S. Cl. .................................................. 35/31 R
[58] Field of Search ................... 35/6, 8 R, 9 R, 9 A, 35/30, 31 R, 31 C, 8, 9, 31; 235/156; 273/DIG. 28; 340/324 AD; 364/709

[56] References Cited

U.S. PATENT DOCUMENTS

| | | | |
|---|---|---|---|
| 2,751,690 | 6/1956 | Cohen | 35/31 R |
| 3,787,988 | 1/1974 | Nakajima et al. | 35/31 R X |
| 3,947,976 | 4/1976 | Hafel | 35/31 C |
| 4,010,556 | 3/1977 | Ellsworth et al. | 35/30 |
| 4,016,411 | 4/1977 | Genin | 35/31 R X |

*Primary Examiner*—Vance Y. Hum
*Attorney, Agent, or Firm*—Herzig & Walsh, Inc.

[57] ABSTRACT

A mathematics teaching system comprises a keyboard, for entering an arithmetic problem to be solved and includes display elements to display said problem and a solution thereto. Electronic components automatically calculate the correct step-by-step solution and provide carry-borrow information to assist the student in making his calculations and performing a step-ty-step solution. Electronic circitry and components compare the calculated step-by-step solution with each step entered by the student and generate a "try again" signal upon entry of an incorrect step by the student. Equipment operable by the student is provided to erase an incorrect step. The system can be set to operate in a manual mode comprising a step-by-step solution by the student or one of two automatic modes, one of the latter comprising the displayed solution upon the entering of the problem and the second comprising the displayed step-by-step solution upon entry of a signal by the student.

34 Claims, 7 Drawing Figures

MATHEMATICS TEACHING SYSTEM

BACKGROUND OF THE INVENTION

1. Field of the Invention

This invention relates to teaching systems and more particularly to electronic teaching systems for teaching mathematics.

2. Description of the Prior Art

Many attempts have been made to employ electronic calculators in the teaching of mathematics. Much of the prior art lacks effectiveness in that it merely teaches the student how to utilize the electronic calculator but not how to perform the mathematical operations by himself in order to arrive at the solution of the problem.

Other prior art devices allow the student to calculate the result using his own mental processes and to enter his calculated solution, which is then compared with the correct solution calculated by the machine. A signal then indicates whether the answer is correct or not. Such devices do not provide information to assist the student in performing the solution and thus function best for students who have already mastered the material. Such devices perform more of a testing or review function than an instruction function. The apparatus described and claimed in U.S. Pat. No. 3,787,988 (Nakajima, et al.) is an example of such a device.

SUMMARY OF THE INVENTION

A mathematics teaching system for use by a student for performing operations involved in calculation comprises: Means for entering a mathematics problem; calculating means for automatically calculating a correct step-by-step solution to the problem; entry means operable by the student to enter a step-by-step solution of the problem; and display means, the calculating means providing information to assist the student in performing his step-by-step solution of the problem, the display means being responsive to the entry means to display the entry calculation steps and being responsive to the calculating means to display the information to assist the student in performing his step-by-step solution.

The display means may comprise the screen of a television receiver, the system being coupled to the television receiver through generation of a television signal received by the television set.

DESCRIPTION OF THE PREFERRED EMBODIMENT

Figure 1:
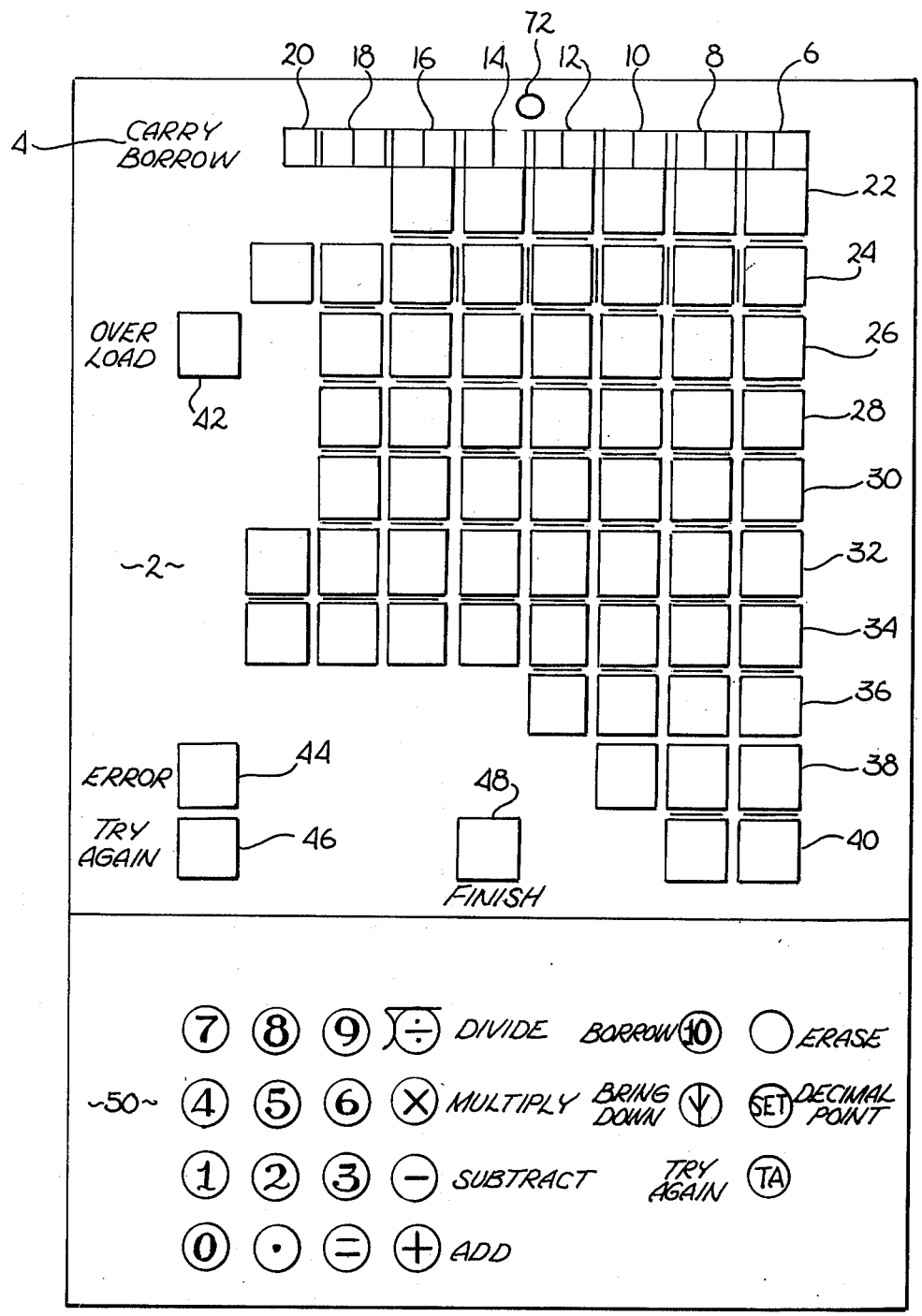
FIG. 1 is a plan view of a display and keyboard of a mathematics teaching system in accordance with the invention.

Referring to FIG. 1, shown therein is a plan view of a display and keyboard of a mathematics teaching system 1 in accordance with the invention. A display 2 comprises a carry-borrow row 4 and a plurality of squares arranged in columns 6, 8, 10, 12, 14, 16, 18 and 20 and rows 22, 24, 26, 28, 30, 32, 34, 36, 38 and 40. Each of the squares is provided with a display device capable of displaying the digits 0 through 9 and in some locations the symbols $+$, $-$, $\times$, $\sqrt{\phantom{x}}$, and a decimal point. The carry-borrow row also includes a display device capable of displaying the numeric digits 1 through 19 and a minus sign.

The display 2 further includes an overload indicator 42, an error indicator 44, a "try again" indicator 46 and a finish indicator 48.

The keyboard 50 comprises keys capable of entering the digits 0 through 9 and a decimal point. Furthermore, the keyboard 50 includes keys for the functions divide, multiply, subtract, add and equals. In addition, the keyboard includes several special purpose keys, such as a borrow key, bring down key, "try again" key, set decimal point key and erase key. The operation and function of each one of the keys in the display is described below.

In practice the display devices may be of a fluorescent type, LCD, LED, segmented digits, a standard television screen, or the like.

Figure 2:
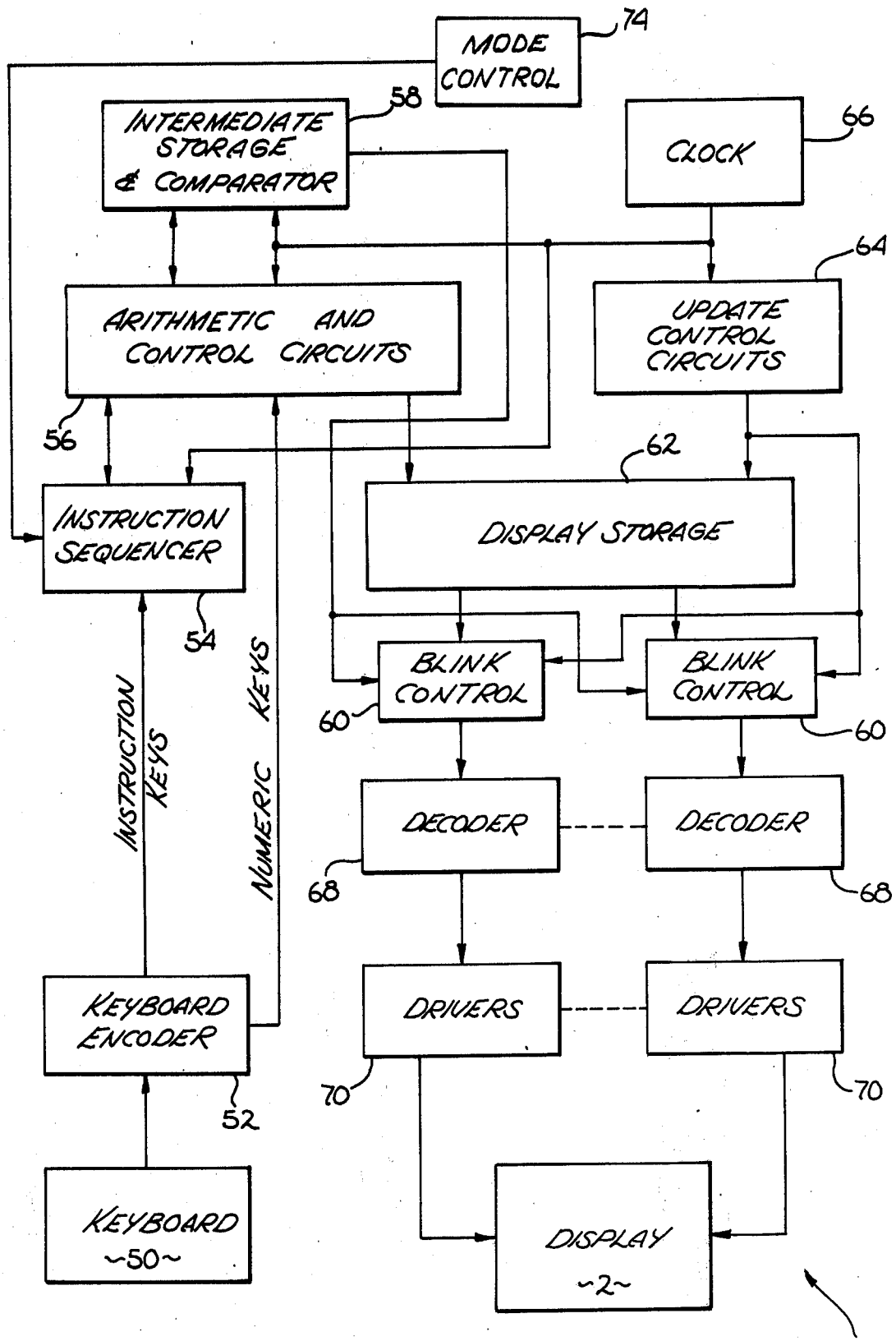
FIG. 2 is a block diagram of a mathematics teaching system in accordance with the invention.

Referring to FIG. 2, shown therein is a block diagram of a mathematics teaching system in accordance with the invention. Teaching system 1 comprises a keyboard 50. The output of keyboard 50 is supplied to a keyboard encoder 52 which in turn supplies outputs to an instruction sequencer 54 and arithmetic and control circuits 56. The instruction sequencer also supplies an output to the arithmetic and control circuit 56. The arithmetic and control circuits 56 communicate with an intermediate storage and comparator 58, which in turn supplies an output to a blink control 60. The arithmetic and control circuits 56 also supply an output to a display storage 62. Update control circuits 64 also supply an output to the display storage 62.

A clock 66 supplies timing and sequencing signals to the instruction sequencer 54, automatic arithmetic and control circuits 56, intermediate storage and comparator 58 and update control circuits 64. The update control circuits 64 also supply an output to the blink control 60. Display storage 62 supplies an output to the blink control 60 which in turn provides an output to decoders 68. Each of the decoders 68 is coupled to a driver 70 which in turn drives one of the display devices which make up the display 2. A mode control 74 regulates operation in an automatic or manual mode, as described in detail below.

In practice each of the blocks, keyboard encoder 52, instruction sequencer 54, arithmetic and control circuits 56, intermediate storage and comparator 58, blink control 60, display storage 62 and update circuits 64, clock 66, decoders 68 and drivers 70 are well known in the art.

In operation when a key on the keyboard 50 is depressed, the closure of a contact on the keyboard 50 is translated by the keyboard encoder 52 into a suitable code such as a five level code for transfer to either the instruction sequencer or directly to the arithmetic control circuit 56. If the key depressed on the keyboard is a number, the keyboard encoder 52 directs the coded number directly to the arithmetic and control circuits 56. If the key depressed on the keyboard corresponds to one of the functions plus, minus, divide, multiply, equals, or one of the special function keys borrow, bring down, "try again", set decimal point and erase, the keyboard encoder encodes the instruction and provides it to the instruction sequencer 54. The instruction sequencer 54 orders the encoded instructions and supplies them to the arithmetic and control circuits.

The arithmetic and control circuits receive the encoded numeric information which corresponds to the depression of a number key and the encoded instructions from the instruction sequencer and performs the required arithmetic calculations that are required. The intermediate storage and comparator 58 is storage for the arithmetic and control circuits and receives therefrom, stores and returns information thereto. The intermediate storage and comparator 58 also compares the calculated step-by-step solution calculated by the arithmetic control circuit 56 with the step-by-step solution entered by the student and generates a "try again" signal which is supplied to the blink control 60 when the calculated step-by-step solution is different than the step-by-step solution entered by the student. The arithmetic and control circuit 56 also determines if there is an error in the arithmetic problem such as pressing the minus key when one should press the addition key in a multiplication problem, dividing zero, etc. If such an error occurs, the arithmetic and control circuit 56 generates an error signal which is supplied to the display storage 62.

The arithmetic and control circuits 56 also supply the problem entered on the keyboard by the student and the step-by-step solution entered by the student on the keyboard to the display storage 62. The display storage 62 stores the information which corresponds to the data and placement of the data to be displayed. The update control circuit 64 controls the rate at which the data stored in the display storage 62 is updated and supplied to the decoders 68. The display data from the display storage 62 may be such data as the numeric information including carry-borrow data, arithmetic notation, the decimal point, vinculum or cursors.

The information supplied from the display storage 62 to the decoders 68 passes through blink control 60 which operates in response to the "try again" signal from the intermediate storage and comparator 58 and the signal from the update control circuit 64. Essentially, the blink control 60 interrupts the flow of data to the decoders 68 when a signal is generated by the intermediate storage and comparator 58 which indicates that the calculated step-by-step solution is at variance with the entered step-by-step solution. In this way, that digit of the step-by-step solution which is incorrect is caused to blink on and off until the incorrect portion of the solution is removed by depressing the "try again" key and the correct portion of the solution is entered. The decoders 68 decode the data from the display storage 62 and supply it to the drivers 70 which in turn drive the appropriate display device of the display 2. For illustrative purposes, in this embodiment there are provided at least one decoder 68 and one driver for each portion of the display 2; however, by applying conventional multiplex techniques the number of decoders and drivers could be reduced and each display device of the display driven intermittently.

Referring to FIGS. 3 through 6, shown therein are the step-by-step solutions as displayed by the display 2 for addition, subtraction, multiplication and division.

Figure 3:
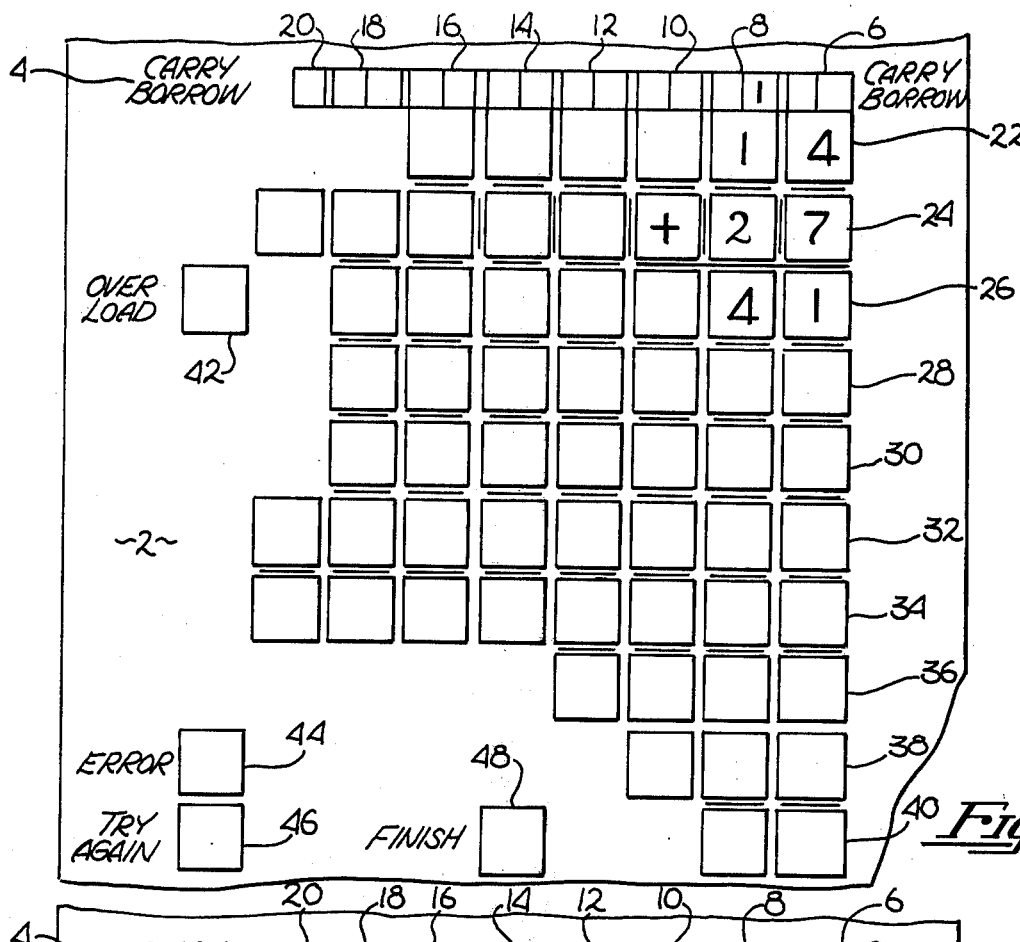
FIG. 3 depicts an arithmetic problem and solution displayed on a mathematics teaching system in accordance with the invention.

Referring to FIG. 3, shown therein is an addition problem. To perform addition, the arithmetic teaching apparatus operates as follows. First, the student depresses the number 1 key. The closure of the 1 key is translated by the keyboard encoder into a code representing the numeric value of the key which is transmitted to the arithmetic and control circuits 56. The arithmetic and control circuits 56 recognize that this is the first entered digit of the problem and convey it to the display storage 62. From the display storage 62 it is supplied to the proper decoder 68 and driver 70 and displayed at the proper place on the display 2 at column 6, row 22. The student then depresses the 4 key and in a similar manner the digit 4 is displayed on the display 2 at the proper place at column 6, row 22, while moving digit 1 to column 8, row 22.

The student then depresses the plus or add key. The closure of the add key on keyboard 50 is encoded by the keyboard encoder 52 as an instruction which is transmitted to the instruction sequencer 54. The instruction sequencer 54 then provides the instruction to the arithmetic and control circuits which recognize that a completed problem has not been entered and transmits the add instruction to the display storage 62. The display storage 62 as controlled by the update control circuits 64 transmits the add instruction to the proper decoder 68 and driver 70 to cause a plus sign to be displayed on the display 2 at the proper place at column 10, row 24. The student then depresses the 2 key and similar to described above, a 2 is caused to appear on the display 2 at the proper place, at column 6, row 24. The student then depresses the 7 key in a similar manner described above, and the 7 is caused to be displayed on the display 2 at the proper place at column 6, row 24, while moving the digit 2 to column 8, row 24. The student then depresses the equals key and the closure of the equals key is encoded by the keyboard encoder 52 and transmitted to the instruction sequencer 54 which in turn supplies the equals instruction to the arithmetic control circuits 56 at the proper time. The arithmetic and control circuits 56 recognize that a completed addition problem has been entered and sends a signal to the display storage 62 to cause a vinculum to appear on the display 2 below the entered numbers. The display storage 62 as controlled by the update control circuit 64 sends a signal to the proper decoders 68 and drivers 70 to cause a line to appear between rows 24 and 26 of the display 2. Concurrently, carry-borrow information relating to the problem appears above the proper columns to instruct the student as he performs his step-by-step solution to the problem.

The student then makes the mental calculation, 4 plus 7, in his mind and dispresses the keys 1, 1, indicating 11. The closure of the two keys 1, 1 is encoded by the keyboard encoder 52 and the 10's digit is caused to be displayed in column 8 of the carry-borrow row 4 and the 1's digit is caused to be displayed below the 4 and the 7 in column 6, row 26. While the digits are being displayed, the arithmetic and control circuits, together with the intermediate storage 58, compute the actual value and compare it with the entered value. Since in this case the two match, no indication is given on the display. If the entered value and the calculated value were at variance, the digit display in either the carry-borrow row or the 1's place would be caused to flash, depending on the error, as a result of the signal from the intermediate storage and comparator 58 to the blink control 60. Also, the intermediate storage and comparator 58 would cause a signal to be transmitted to the display storage 62 which in turn would be transmitted through the proper decoder 68 and driver 70 to cause the "try again" portion of the display to operate. If the "try again" portion 46 of the display is caused to operate, the student must depress the "try again" button which clears the entry which is in error and mentally re-calculate the solution and enter it via the keyboard.

Continuing with the addition problem, the student then makes the mental calculation of adding the 1 in the carry-borrow row 4 and together with the 1 and the 2 and enters the digit 4 which is similarly displayed on the display 2 while the result is calculated and the comparison is done. After the last digit of the solution is entered, the finish 48 portion of the display is caused to operate. In the above manner, addition is taught by the teaching apparatus in accordance with the teachings of the present invention.

Figure 4:
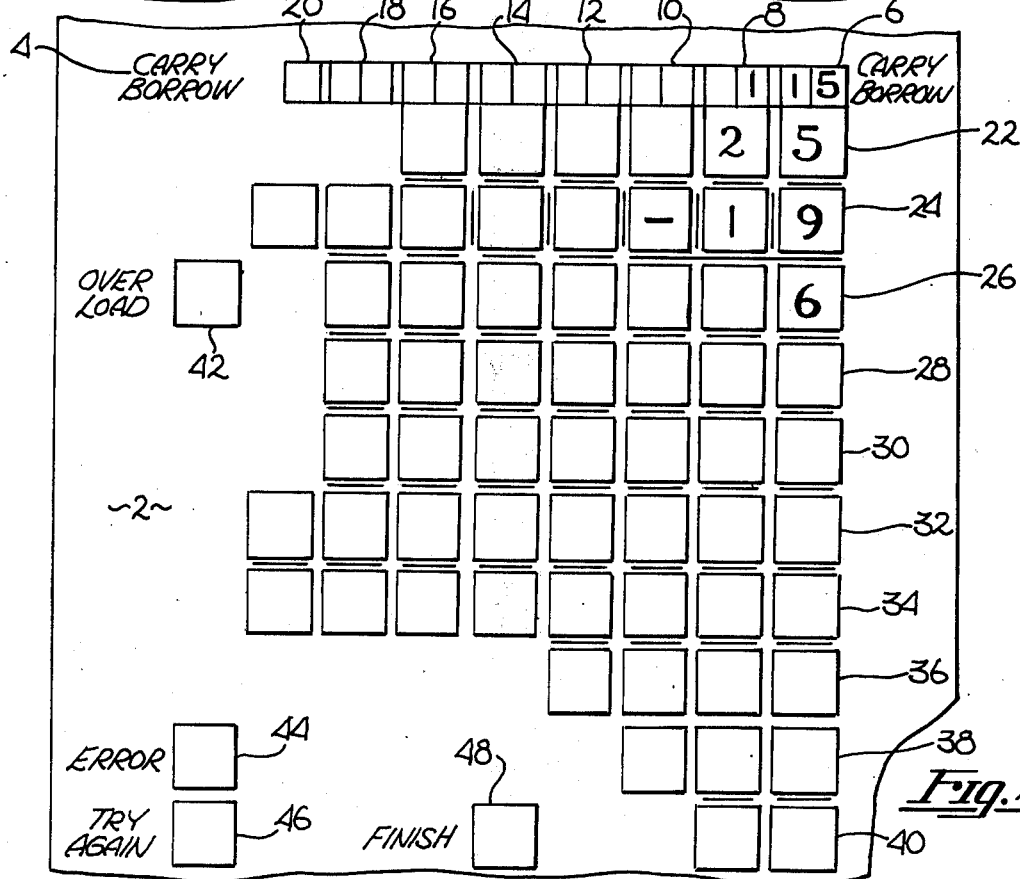
FIG. 4 depicts a subtraction problem and solution displayed on a mathematics teaching system in accordance with the invention.

Referring to FIG. 4, shown therein is the step-by-step solution of a subtraction problem. In the subtraction problem of FIG. 4, the digits 25 and 19 and the minus sign and the line are entered and displayed in substantially the same manner as that previously described. In the substraction problem, the student first makes the mental realization that he cannot subtract 9 from 5 and must borrow from the 10's column. Accordingly, the student depresses the borrow 10 key of the keyboard 50. The closure of the key is encoded by the keyboard encoder 52 which sends an instruction to the instruction sequencer 54 which in turn provides the instruction at the proper time to the arithmetic and control circuits 56. The arithmetic and control circuits 56 perform the arithmetic function of subtracting 1 from the 10's column, dimming the 10's column digit, and causing a 1 to appear in the carry-borrow row 4 at column 8 by an appropriate signal to the display storage 62, and a 15 to be displayed in the carry-borrow row 4 at column 6. The student then performs the mental calculation of subtracting the 9 from 15 and depresses the 6 key which is displayed at column 6, line 26. Since the problem is now completed and correct, the finish display 48 of display 2 is operated.

Figure 5:
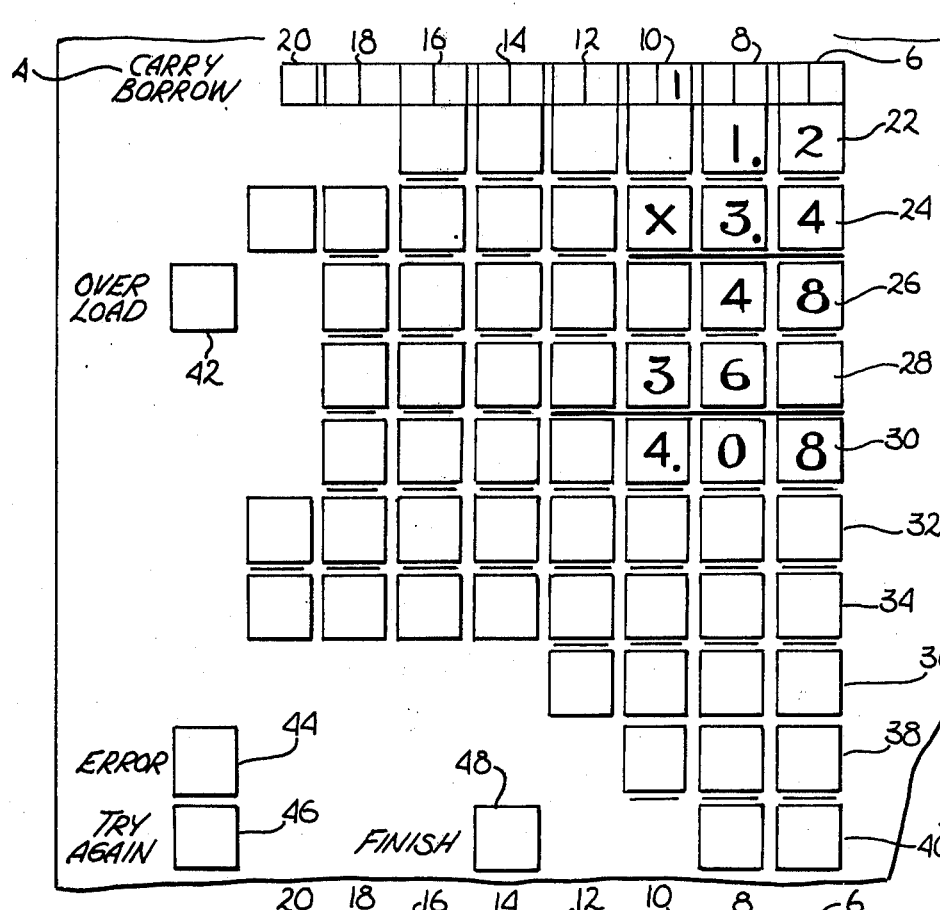
FIG. 5 is a multiplication problem displayed on a mathematics teaching system in accordance with the invention.

Referring to FIG. 5, shown therein is the step-by-step solution of a multiplication problem. In FIG. 5 the numbers, the decimal point, the multiplication sign and the vinculum are caused to be displayed in a manner similar to that described above. The student then makes the mental calculation, 2 times 4, and depresses the 8 key on the keyboard 50 which is caused to be displayed in a similar manner as described above, at column 6, row 26. The student then makes the metal calculation, 1 times 4, and depresses the 4 key which is caused to be displayed in a similar manner as described above, at column 8, row 26. At this point in the calculation, the teaching apparatus has made the appropriate calculations and comparisons to insure the correctness of the student and now recognizes that the first portion of the arithmetic solution is completed.

The student now makes the mental calculation, 2 times 3, and depresses the 6 key which is caused to be displayed in a similar manner as described above, at column 8, row 28, and at the same time the calculation is made by the arithmetic and control circuits 56 together with the intermediate storage and comparator 58. Also, the comparison is made by the intermediate storage and comparator 58. The student then makes the mental calculation, 1 times 3, and depresses the 3 key which is caused to be displayed in a similar manner as described above at column 10, row 28. The student then depresses the plus key which causes the teaching apparatus to display a line between rows 28 and 30 and to recognize that the student now is going to do the addition in order to complete the multiplication problem.

The student then makes the mental calculation of 8 plus 0 and depresses the 8 key which is caused to be displayed at column 6, row 30. The student then makes the mental calculation, 4 plus 6 equals 10, and depresses the 1, 0 keys, in that order. The 0 is displayed at column 8, row 30 and the 1 is displayed in the carry-borrow row 4, column 10. The student then makes the mental calculation, 1 plus 3, and depresses the 4 key and a 4 is caused to be displayed at column 10, row 30. At this point, the student has all the digits correct but has not entered the decimal point and, therefore, the finish portion 48 of the display 2 is not operated. The student then depresses the set decimal key which causes a decimal point to be displayed at column 6, row 30 and depresses the 0 key a number of times which corresponds to how many places from the right the student desires to move the decimal. In this case, the student depresses the set decimal point key and then the 0 key twice and a decimal point is caused to be displayed between the 4 and the 0 in row 30. The solution is now complete and the finish portion of the display 2 is operated.

Figure 6:
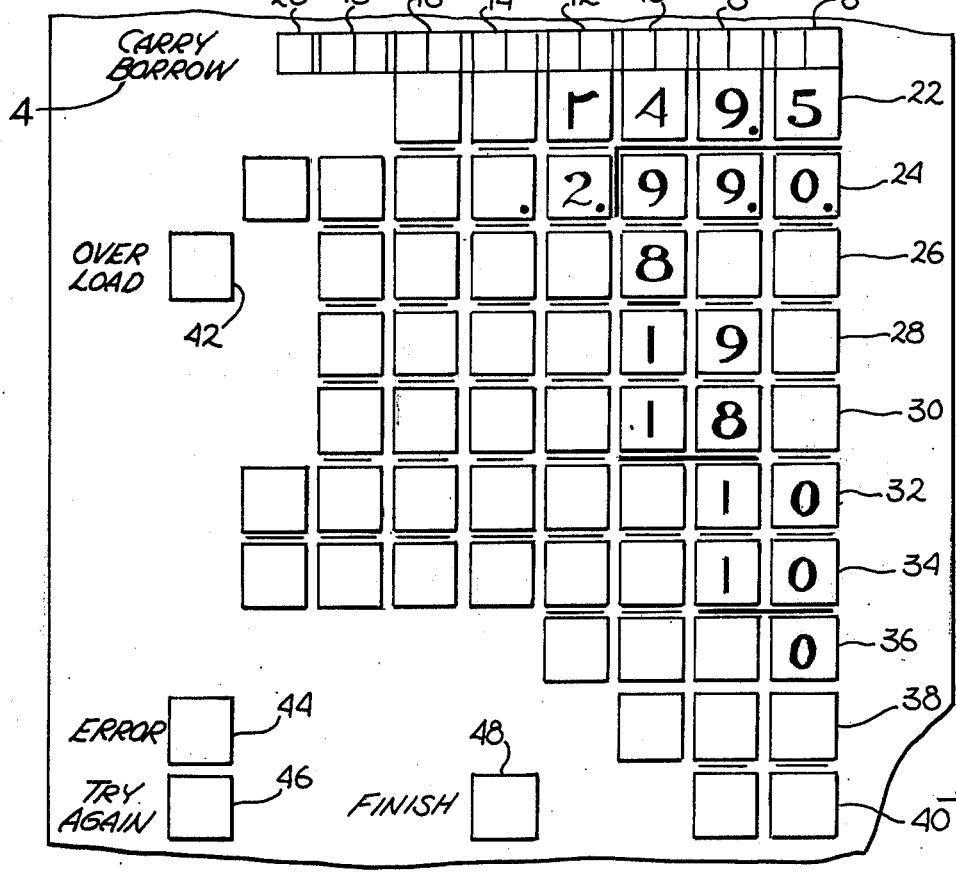
FIG. 6 is a division problem displayed on a mathematics teaching system in accordance with the invention.

Referring to FIG. 6, shown therein is the step-by-step solution of a division problem. In the division problem of FIG. 6, the problem is entered and displayed in substantially the same manner as previously described except that when the dividend 99 is originally entered and displayed, it appears in columns 6 and 8, row 22. When the division key is then depressed, the dividend then moves to columns 8 and 6, row 24, and a divide bracket is placed around it. Before the equal sign key is depressed and the solution to the problem began, the decimal point must be set in the dividend, divisor and quotient. To set the decimal point, the set decimal point key is depressed; then the 0 key is depressed the number of times which corresponds to the number of decimal places in the divisor. The decimal point then appears at the correct place, and the display is then shifted and the proper number of zeroes displayed. In the example of FIG. 6, the 0 key need only be depressed once. It should be noted, however, that the original decimal points are not erased and may be displayed at a slightly lower intensity.

Now that the decimal point is set, the student depresses the equals key and a ⌐ is also displayed directly above the last digit of the divisor. The student then makes the mental calculation, 2 divided into 9 equals 4, and depresses the 4 key, and a 4 is caused to be displayed in a similar manner as described above in the proper place. The student then makes the mental calculation, 4 times 2 equals 8, and depresses the 8 key which is caused to be displayed at the proper place. The student then depresses the minus key and a line appears below the 8, and the student makes the mental calculation, 8 from 9, and depresses the 1 key which is caused to be displayed directly below the 8. The student then depresses the bring down key, and the 9 is brought down next to the 1 in column 8, row 28. The student then makes the mental calculation, 2 divided into 19 equals 9, and depresses the 9 key, and a 9 is displayed at the proper place in row 22. The student then makes the mental calculation, 9 times 2, and depresses the keys 1, 8, and the digits 18 are displayed below the 19. The student then depresses the minus symbol which causes a line to be drawn below the digits 1, 8 in row 30. The student then depresses the 1 key, and it appears in the proper place at column 8, row 32. The student then depresses the bring down key which causes a 0 to be brought down next to the 1 in row 32.

The student then makes the mental calculation, 2 divided into 10 equals 5, and depresses the 5 key. Again, the arithmetic and control circuits cause the display to display the 5 in the proper place at column 6, row 22. The student then makes the mental calculation, 5 times 2 equals 10, and depresses the 1 and then 0 keys, which is followed by the depression of the subtraction key and the depression of the 0 key. Since the problem is now complete, the finish portion 48 of the display is operated.

It should be apparent that, during all of the calculations above described, the arithmetic and control circuits 56, together with the intermediate storage and comparator 58, automatically calculates the solution to each step performed by the student and compares it to insure that there is no variance. If there were a variance, the intermediate storage and comparator 58 would cause the digit in error to flash.

The following is a description of portions of the display and keys which have not been previously discussed in relation to the figures. The overload portion 42 of the display 2 indicates that a number has been entered on the keyboard 50 or an interim calculation of the step-by-step solution, which is larger than can be displayed on the display 2. The overload sensing function is performed by the arithmetic and control circuits 56. Also, in the carry-borrow row 4, if the student attempts to borrow 10 from a column which already contains a 0, a flashing minus 1 is displayed in the carry-borrow row 4 directly above the 0. epression of the erase key clears the machine and turns off the display.

The mode of operation of system 1 can be selected by a mode selector 74. The system may have three modes of operation. One mode is manual; the others are automatic modes. The manual mode of operation is the operation of the teaching machine as described above. One of the two automatic modes comprises a mode in which the step-by-step solution is caused to be displayed on the display 2 each time the "try again" key is depressed. The other automatic mode is one in which the total solution is automatically displayed once the problem is entered. The actual selection of mode of operation and the control of the display 2 is performed by the arithmetic and control circuits 56 together with the display storage 62. Means may be provided to count the number of "try again" signals generated during the course of a solution to a problem, thus permitting monitoring of the student's progress.

Figure 7:
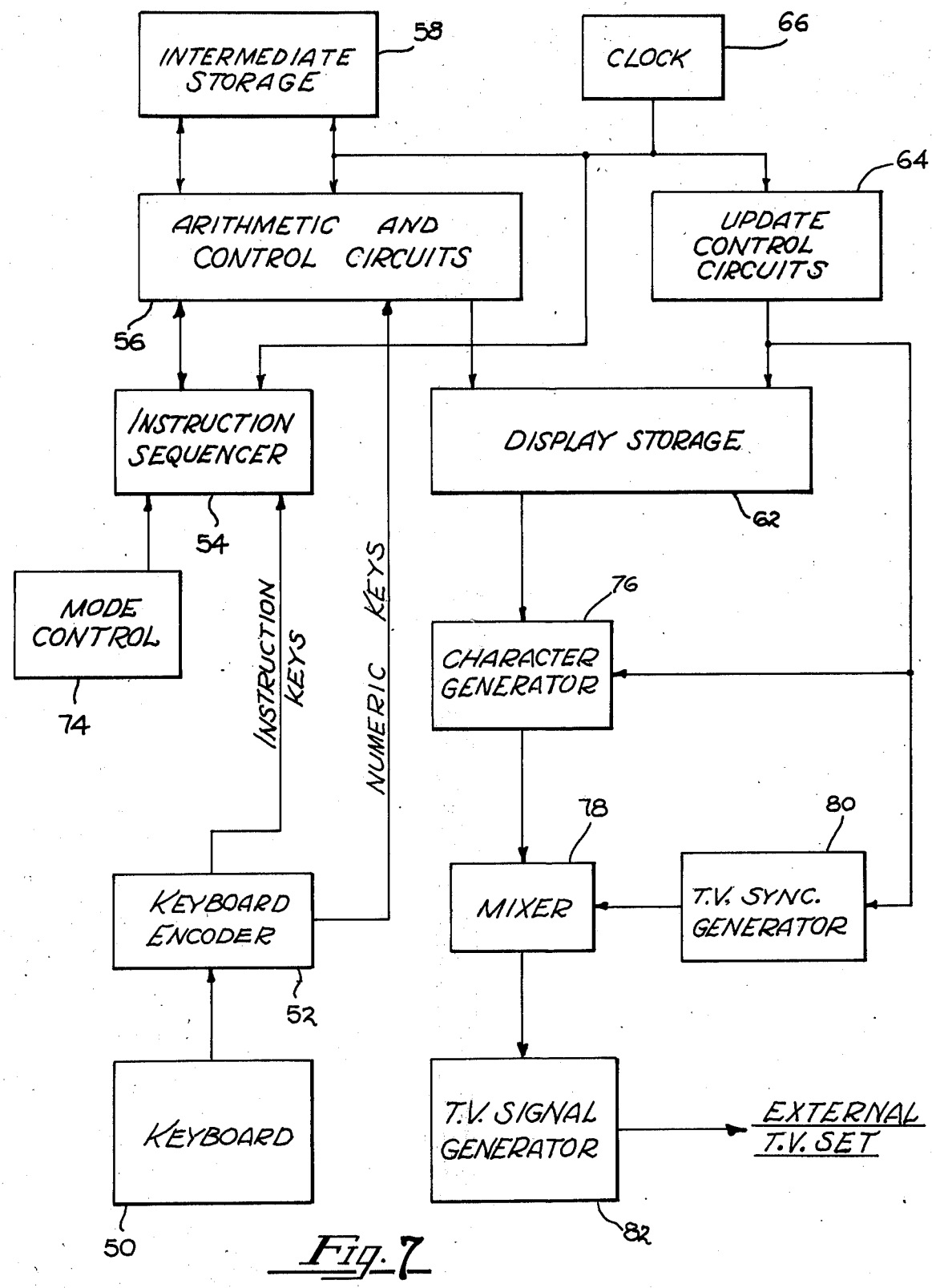
FIG. 7 depicts a mathematics teaching system coupled to a television receiver.

As depicted in FIG. 7, a mathematical teaching system in accordance with the invention is adapted for use in conjunction with a standard home television receiver (not shown). In this embodiment, the screen of the television set serves as the display for the system. The system is the same as that described and depicted above as to that portion which provides input to the display storage.

The display storage 62 is coupled to a character generator 76. Also connected to the character generator 76 is the output of the update control circuit 64. The output of character generator 76 is connected to a mixer 78.

Also connected to the mixer 78 is output from a television sync generator 80. Sync generator 80 receives input from the update control circuit 64. The output of mixer 78 is connected to the input of a television signal generator 82.

The above-described combination of elements affords the capability of providing a television signal which can be coupled to the antenna terminal of a conventional television set such that the display of the teaching system in accordance with the invention may be implemented on the television screen. This will clearly be advantageous in particular applications, particularly for homework.

The teaching system could be further implemented to display simple games, such as Tic-Tac-Toe, so as to amuse the student. In addition, the teaching apparatus could be implemented with a means for randomly generating problems to be solved by the student.

Thus, teaching systems in accordance with the invention provide instruction to students such as to simulate actual "pencil and paper" operations and thus equip the student to perform arithmetic operations without assistance from a person or machine.

It should be apparent to one skilled in the art that the above-described embodiment is merely illustrative of but one of the many possible specific embodiments which represent the application of the principles of the present invention. Numerous and various other arrangements can be readily devised by those skilled in the art without departing from the spirit and scope of the invention, the invention being defined solely by the appended claims interpreted in light of the specification.

What is claimed is:

1. A mathematics teaching system for use by a student, for performing operations involved in calculation comprising:
    entry means operable by said student to enter a mathematics problem and a step-by-step solution of said problem;
    calculating means for automatically calculating a correct step-by-step solution to said problem; and
    display means, said calculating means providing carry and borrow information to assist the student in performing calculations required in calculating said step-by-step solution of said problem, said display means being responsive to said entry means to display the entered calculation steps and being responsive to said calculating means to display said carry and borrow information to assist said student in performing calculations required in calculating said step-by-step solution.

2. The invention as set forth in claim 1 further including means for comparing the calculation steps entered by the student to the correct step-by-step solution and for providing a signal when the student enters a step at variance with the correct calculated step-by-step solution.

3. The invention as set forth in claim 2 further including means operable by the student to erase an incorrect calculation step entered by the student.

4. The invention as set forth in claim 1 further including means for providing a display of the correct step-by-step solution to said problem without requiring a step-by-step solution by the student.

5. The invention as set forth in claim 4 wherein said display of the correct calculated step-by-step solution to said problem is displayed each time the student enters an incorrect calculation step.

6. The invention as set forth in claim 1 further including means for providing a finish signal upon correct completion of said step-by-step solution by the student, said display means being responsive to said finish signal to display said finish signal.

7. The invention as set forth in claim 1 wherein said display means includes a decimal point.

8. The invention as set forth in claim 1 wherein said display means includes a vinculum.

9. The invention as set forth in claim 1 wherein said display means includes a plurality of arithmetical symbols.

10. The invention as set forth in claim 1 further including means operable by the student to perform the arithmetic operation of borrowing.

11. The invention as set forth in claim 1 further including means operable by the student to perform the arithmetic operation of bringing down.

12. The invention as set forth in claim 1 further including means operable by the student to clear an incorrect entry made by the student.

13. The invention as set forth in claim 1 further including means operable by the student to set the position of the decimal point.

14. The invention as set forth in claim 1 further including means operable by the student to clear the problem from the system.

15. A mathematics teaching system for use by a student comprising:
   means for entering an arithmetic problem;
   calculating means for automatically calculating a correct step-by-step solution to said problem;
   display means comprising a plurality of display elements;
   entry means operable by said student to enter a step-by-step solution of said problem, said calculating means providing carry and borrow information to assist the student in making each step-by-step calculation in said solution, said display means including a first section comprising a plurality of said display elements in a row to display said carry and borrow arithmetic information, a second section comprising a plurality of said display elements in a plurality of rows and columns to display said arithmetic problem and said step-by-step solution thereto, said display means including a third section comprising a plurality of said display elements; and
   means for comparing the correct calculated step-by-step solution to the solution entered by the student to generate a signal indicating an incorrect calculation by the student, said third section of said display means being responsive thereto.

16. The invention as set forth in claim 15 wherein said first section of display means is disposed above said second section such that the information concerning carrying and borrowing appears above the column of the problem to which it relates.

17. The invention as set forth in claim 15 further including means for providing an error signal upon performance of an unpermitted arithmetic operation and wherein said third section of said display includes display elements responsive thereto to display said signal.

18. The invention as set forth in claim 15 further including means operable by the student to display a complete step-by-step solution without requiring the student to work out a step-by-step solution.

19. The invention as set forth in claim 15 wherein means responsive to said signal indicating an incorrect calculation by the student in the step-by-step solution causes the incorrectly entered calculation step to blink.

20. The invention as set forth in claim 15 further including means operable by the student to erase an incorrect calculation step.

21. The invention as set forth in claim 15 wherein said display means includes a decimal point and further including means operable by the student for adjusting the position of the decimal point.

22. The invention as set forth in claim 15 wherein said display means includes a vinculum.

23. The invention as set forth in claim 15 wherein said display means includes a plurality of arithmetical symbols.

24. The invention as set forth in claim 15 wherein said display means comprises a screen of a television receiver and further including means to couple said entry means, said means for entering an arithmetic problem, said calculating means and said comparing means to said television receiver.

25. The invention as set forth in claim 15 further including means operable by the student to perform the arithmetic operation of borrowing.

26. The invention as set forth in claim 15 further including means operable by the student to perform the arithmetic operation of bringing down.

27. The invention as set forth in claim 15 further including means operable by the student to clear an incorrect entry made by the student.

28. The invention as set forth in claim 15 further including means operable by the student to set the position of the decimal point.

29. The invention as set forth in claim 15 further including means operable by the student to clear the problem from the system.

30. A mathematics teaching system operable by a student comprising:
   entry means for entering an arithmetic problem and for entering a step-by-step solution to said problem;
   calculating means for automatically calculating a correct step-by-step solution to said problem;
   comparison means for comparing the correct calculated step-by-step solution to the step-by-step solution calculated by the student and for generating a signal indicating error when a calculation step entered by the student differs from the correct calculated step-by-step solution, said calculating means providing carry-borrow information to assist the student in making each calculation step in performing the calculation of the step-by-step solution to the problem; and
   display means comprising a screen of a television receiver, said display means being coupled to said means for entering an arithmetic problem, said calculation means, said entry means and said comparison means such that said display means is actuated to display said arithmetic problem, said entry of said calculation steps by the student, said borrow-carry information and said signal indicating a variance between the correct calculated step-by-step solution and an incorrect calculation step by the student.

31. The invention as set forth in claim 30 wherein said display means display said carry-borrow information above columns of said problem to which the information relates.

32. The invention as set forth in claim 31 further including means for providing a finish signal when a complete and correct step-by-step solution has been performed by the student, said display means being responsive to said finish signal to display the same.

33. The invention as set forth in claim 31 further including means operable by the student to erase an incorrect calculation step.

34. The invention as set forth in claim 30 further including television signal generating means responsive to said entry means, calculation means and comparison means to generate a television signal to be received by said television receiver.

* * * * *